United States Patent
Davis

(10) Patent No.: US 9,637,712 B2
(45) Date of Patent: *May 2, 2017

(54) METHOD FOR RAPID MATURATION OF DISTILLED SPIRITS USING LIGHT AND HEAT PROCESSES

(71) Applicant: Lost Spirits Distillery, LLC, Salinas, CA (US)

(72) Inventor: Bryan Alexander Davis, Salinas, CA (US)

(73) Assignee: LOST SPIRITS DISTILLERY, LLC, Salinas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/594,944

(22) Filed: Jan. 12, 2015

(65) Prior Publication Data
US 2015/0197716 A1 Jul. 16, 2015

Related U.S. Application Data

(63) Continuation-in-part of application No. 14/152,915, filed on Jan. 10, 2014, now abandoned.

(51) Int. Cl.
*C12H 1/18* (2006.01)
*A23L 3/005* (2006.01)
(Continued)

(52) U.S. Cl.
CPC .............. *C12G 3/065* (2013.01); *C12H 1/165* (2013.01); *C12H 1/18* (2013.01)

(58) Field of Classification Search
CPC .......... C12C 3/065; C12G 3/06; C12G 3/005; C12G 3/08; C12G 3/12; C12G 3/065;
(Continued)

(56) References Cited

U.S. PATENT DOCUMENTS 334,222 A * 1/1886 Fitch ................... C12G 3/065
99/277.1
590,308 A 9/1897 Etly
(Continued)

FOREIGN PATENT DOCUMENTS

DE 2829964 C2 7/1990
EP 2128238 B1 2/2009
(Continued)

OTHER PUBLICATIONS

C.A. Crampton and L.M. Tolman, "A Study of the Changes Taking Place in Whiskey Stored in Wood," Journal of the American Chemical Society, vol. 30, Proceedings of the American Chemical Society for the Year 1908, Luchenbach printing Company, Easton, PA.
(Continued)

*Primary Examiner* — Jill Warden
*Assistant Examiner* — Hong T Yoo
(74) *Attorney, Agent, or Firm* — Polsinelli PC

(57) ABSTRACT

An improved system and process for rapidly producing distilled spirits having characteristics associated with a much longer maturation process is provided. The method involves contacting wood with an unmatured distilled spirit under heated conditions and contacting the resulting heat-treated spirit with actinic light. The disclosure provides embodiments where a spirit is sequentially processed through heat and actinic light treatment. The disclosure also provides embodiments where a heat-treated spirit is mixed with a spirit that has been separately treated with light to give characteristics of a mature spirit.

27 Claims, 8 Drawing Sheets

(51) Int. Cl.
*C12G 3/07* (2006.01)
*C12H 1/16* (2006.01)

(58) Field of Classification Search
CPC ........... C12H 1/165; C12H 1/18; A23L 3/005; G12G 3/005
See application file for complete search history.

(56) References Cited

U.S. PATENT DOCUMENTS

| | | | |
|---|---|---|---|
| 2,027,099 A * | 1/1936 | Hochwalt | C12G 3/065 426/262 |
| 2,195,662 A * | 4/1940 | Van Sant | C12H 1/165 252/582 |
| 2,653,092 A | 4/1951 | Renier | |
| 3,787,587 A | 1/1974 | Weber | |
| 5,102,675 A | 4/1992 | Howell et al. | |
| 5,942,444 A | 8/1999 | Rittenburg et al. | |
| 6,001,410 A | 12/1999 | Bolen et al. | |
| 6,703,060 B1 | 3/2004 | Gross, II et al. | |
| 6,846,503 B2 | 1/2005 | Vickers, Jr. | |
| 6,869,630 B2 | 3/2005 | Gross, II et al. | |
| 7,063,867 B2 | 6/2006 | Tyler, III et al. | |
| 7,972,859 B2 | 7/2011 | Eastwood et al. | |
| 9,237,767 B2 * | 1/2016 | Fiset | A23L 3/28 |
| 2001/0018086 A1 | 8/2001 | Gross, II et al. | |
| 2003/0035856 A1 | 2/2003 | Vickers, Sr. | |
| 2003/0110951 A1 | 6/2003 | Tyler, III et al. | |
| 2005/0123658 A1 | 6/2005 | Tyler, III et al. | |
| 2008/0091291 A1 | 4/2008 | Roy et al. | |
| 2009/0291175 A1 | 11/2009 | Wei et al. | |
| 2010/0071259 A1 | 3/2010 | Hu et al. | |
| 2011/0070330 A1 | 3/2011 | Watson et al. | |
| 2011/0070331 A1 | 3/2011 | Watson et al. | |
| 2012/0058161 A1 | 3/2012 | Prestwich et al. | |
| 2012/0088018 A1 | 4/2012 | Lix | |
| 2012/0164300 A1 | 6/2012 | Niazi | |
| 2013/0149423 A1 | 6/2013 | Lix | |
| 2013/0228080 A1 * | 9/2013 | Fiset | A23L 3/28 99/451 |

FOREIGN PATENT DOCUMENTS

| | | |
|---|---|---|
| FR | 1164437 | 10/1958 |
| FR | 1252201 | 12/1960 |

OTHER PUBLICATIONS

International Search Report and Written Opinion, PCT/US2014/048421, Dated Nov. 14, 2014.
International Search Report and Written Opinion, PCT/US2015/011056, Dated Apr. 13, 2015.
The International Bureau of WIPO, International Preliminary Report on Patentability for PCT/US2014/048421 dated Jan. 26, 2016.

* cited by examiner

METHOD FOR RAPID MATURATION OF DISTILLED SPIRITS USING LIGHT AND HEAT PROCESSES

CROSS-REFERENCE TO RELATED APPLICATION

This application claims priority to U.S. Ser. No. 14/152,915, filed Jan. 10, 2014, which is hereby incorporated by reference in its entirety.

TECHNICAL FIELD

The technical fields are: Food Chemistry and Other Consumer Goods.

BACKGROUND ART

By some accounts, human beings have been aging distilled spirits in wooden containers for almost five hundred years. Despite billions of person-hours of experience, the myriad of chemical reactions responsible for the flavor of wood-aged spirits are not fully understood. Spirits derive their distinct characteristics over time while stored in wooden containers in part by the production and presence of esters. Esters are compounds made by chemically bonding acid molecules and alcohol molecules to form new compounds, often with pleasant aromas and tastes. This process is known as "esterification." In addition to esterification, wood-aged spirits derive additional characteristics through other processes, including extraction of flavor compounds from the wood container (e.g., the ubiquitous oak barrel). These processes are not necessarily separate or distinct, and can interact with and affect each other.

Traditionally, producing wood-aged distilled spirits has included carboxylic acid esterification, phenolic acid esterification, and the formation of complex esters, including both phenolic and carboxylic acids. Carboxylic acid esters are responsible for the fruity aromas and tastes in distilled spirits. Carboxylic precursor acids are derived from the yeast and bacteria during fermentation. If organic materials are used for the container in which these reactions occur, those materials also influence the process. For example, where a charred or toasted oak barrel is used, carboxylic precursor acids are also derived from thermal decomposition of the oak polymer, hemi-cellulose, found in the inner lining of the barrel. Carboxylic precursor acids are largely responsible for "off-flavors" in distilled spirits. Additionally, a common flaw with a solvent-like "off flavor" is produced by build-up of ethyl acetate in the maturing spirit. Off-flavors are various flavorful or aromatic compounds present in spirits that are often described by connoisseurs using colorful terms (e.g., "sulfury", "solventy", "meaty", "acidic", "metallic", "vegetal", etc.). Phenolic aldehydes also play a major role producing aromas similar to vanilla, pipe tobacco, and smoke. Phenolic aldehydes are largely derived from thermally broken down oak polymers found within the inner lining of the barrel. Complex esters are responsible for complex honeyed aromas in distilled spirits. The complex esters are generally produced from the chemical reactions of both carboxylic and phenolic acids/aldehydes with alcohols during the time in the barrel or other container.

Fischer esterification of fatty acids and alcohol is a well-understood and commonly practiced chemical reaction. A typical laboratory process involves heating a solution of fatty acids and alcohols under reflux in the presence of an acid catalyst. In laboratory settings, strong acids (e.g., sulfuric acid) are typically employed as the catalyst, but this can be incompatible with spirit making where other functional groups are sensitive to stronger acids and where chemical additives are typically prohibited. It has long been known that Fischer esterification can also be completed using weak acid catalysts, but at the expense of relatively slow reaction rates. Where charred or toasted oak barrels are used during the maturation of distilled spirits, weak acids may be gradually extracted from organic material in the walls of the barrel. It typically takes years for esters to accumulate using weak acid catalysts derived from the barrel, although it has been observed that in warmer environments (i.e., modestly heated within the range of normal atmospheric conditions less than 120° F.) the process can be accelerated significantly (from decades to years). This early form of accelerated aging comes at the cost of increased evaporation from the barrel. Often as much as 50% of the product can be lost to evaporation.

Wood extraction is the process that gives distilled spirits their color and astringent "oaky" and "smoky" taste. Traditionally, this is attributed to tannins (polyphenols). Interestingly our analysis of mature spirits did not find significant evidence of tannins. But instead found myriad less complex wood derived phenols such as sinapaldehyde and syringaldehyde. These oak-extracted compounds proved unexpectedly useful as markers for monitoring the aging process described below.

Attempts have been made to accelerate maturation of distilled spirits by cycling or varying pressures over relatively large ranges (e.g., between −2 and 10 ATM; see U.S. Patent Publication No. 2013/0149423). These processes generally do not yield a product close enough to that produced by traditional means. Other environmental conditions are more important to achieve characteristics associated with a mature flavor.

Esterification and the extraction of wood compounds from the wood container are some of the primary reactions taking place in the maturation process of distilled spirits. Because these processes run concurrently, and often interact with or depend on each other as well as the material and other conditions of their environment over time, it is very difficult to deviate very far from traditional methods while still achieving similar results. For example, rapid oak extraction may not provide enough time for interaction with a wood container to pick up some of the more subtle and complex flavors present in traditionally aged spirits. Much of the expense in spirit making stems from the long latency in creating the end product as well as the product evaporation from the barrel. Stock must be stored, often in climate-controlled environments, and tested repeatedly during maturation. But, it is difficult to predict markets many years out. Makers that produce too much product fail to maximize their investment, whereas those that produce too little fail to capture potentially significant portions of the upside.

Consumers of distilled spirits are often educated and discerning. Many will refuse to consume or pay a premium for non-authentic tasting products. What is needed is a means by which the quality and complexities associated with traditionally aged spirits can be achieved in a significantly reduced timeframe, preferably with a reduction in the evaporation of finished goods and a reduction of the build-up of ethyl acetate.

SUMMARY

Provided herein is a process for producing a distilled spirit having characteristics associated with a mature spirit comprising: (a) contacting an unmatured distilled spirit with wood at a temperature between about 140° F. and about 170° F. for a period of time ranging from about 24 hours to about 336 hours to give a distilled spirit mixture; (b) contacting the distilled spirit mixture with wood and actinic light at a wavelength ranging from 400 nm to 1000 nm for a cumulative exposure of at least 2,280,000 lux hours to give an actinic light-treated distilled spirit mixture; and (c) providing heat to the actinic light-treated distilled spirit mixture produced in step (b) to maintain a temperature between about 140° F. and about 170° F. for a period of time ranging from about 12 hours to about 336 hours to produce the mature spirit.

In still another embodiment, the disclosure provides a process for producing a distilled spirit having characteristics of a mature spirit comprising, (a) contacting a first unmatured distilled spirit with wood at a temperature between about 140° F. and about 170° F. for a period of time ranging from about 24 hours to about 336 to give a first distilled spirit mixture; (b) contacting a second unmatured distilled spirit with wood and actinic light at a wavelength ranging from 400 nm to 1000 nm for a cumulative exposure of at least 2,280,000 lux hours to give a second distilled spirit mixture; and (c) mixing the first and second distilled spirit mixtures to produce the mature spirit.

Other features and aspects of the disclosure will be provided in more detail herein.

DETAILED DESCRIPTION

Figure 1:
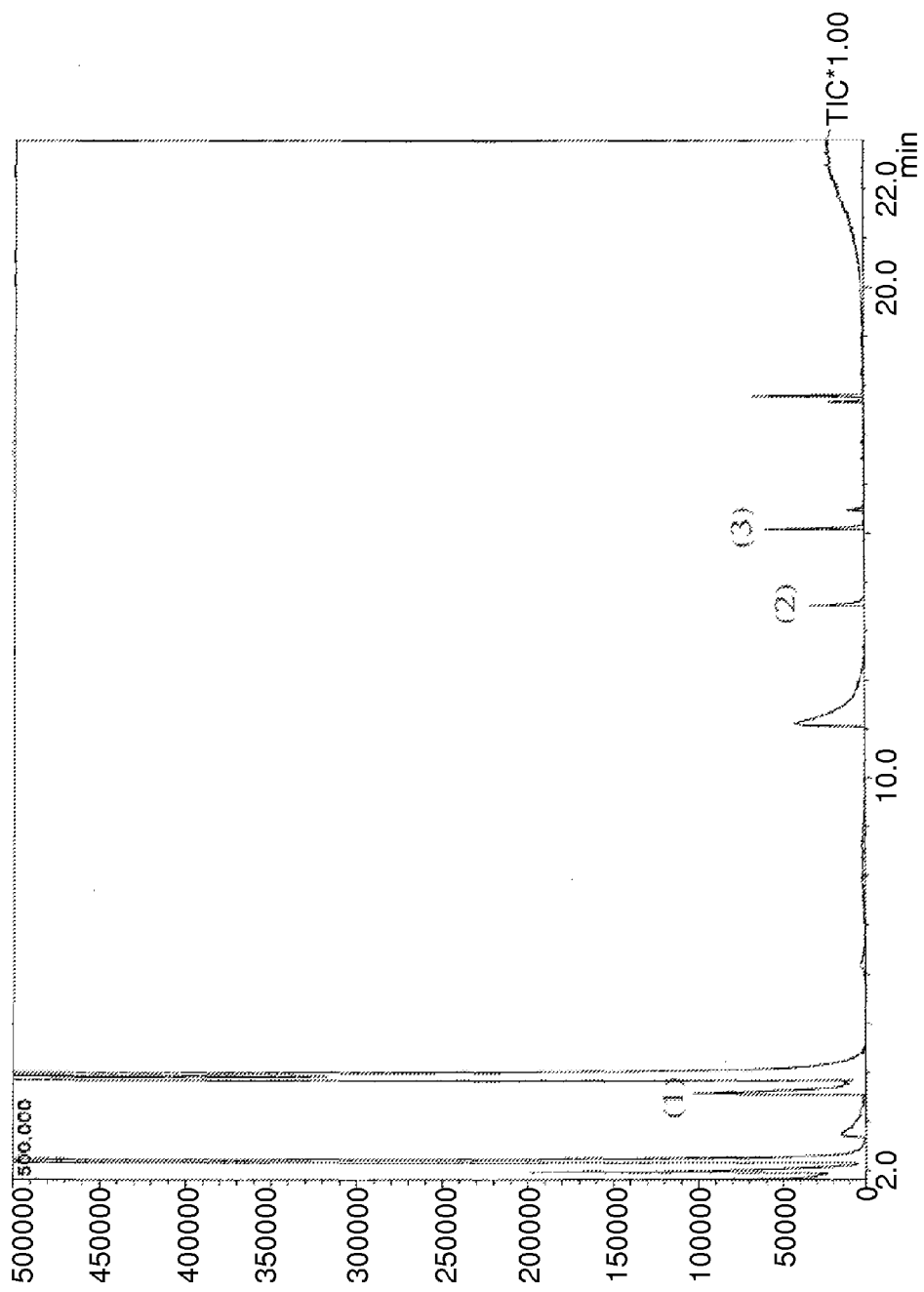
FIG. 1 shows the GCMS chromatogram from an unprocessed rum sample.

The invention pertains to processes for producing a distilled spirit having characteristics associated with a mature distilled spirit. The distilled spirit produced in accordance with the process has many of the characteristics associated with a matured distilled spirit produced in accordance with industry standards, but is advantageously produced in a shortened timeframe while eliminating the evaporation problem and greatly reducing the "off flavors" associated with excess ethyl acetate. By contacting an unmatured distilled spirit with wood at increased temperatures and contacting the spirit with actinic light, the maturation process can be shortened without reducing the quality of the spirit. In particular, it has surprisingly been found that the processes described herein produce a spirit having similar chemical markers as a 32 year-old spirit in a significantly reduced period of time.

As used herein, a spirit refers to any distilled spirit. In particular embodiments, the spirit is a sugar cane-based, grain-based, fruit-based, or agave-based spirit such as rum, tequila, mescal, whiskey, brandy, gin, or combinations thereof.

A distilled spirit having the characteristics associated with a matured distilled spirit, as used herein, describes a spirit, which, by one or more chemical markers, has attained characteristics associated with spirits aged in accordance with industry standards. Such standards, for example, include aging a spirit in wood over a period of time greater than 1, 5, 10, 15, 20, 25 or 30 years. The characteristics associated with a matured distilled spirit may include taste, aroma, and body profiles, such as smoothness.

Historically, ethyl acetate concentration was used as a marker for the progress of aging where higher amounts indicate greater maturation time. But, ethyl acetate is not itself desirable and adds a flavor and aroma comparable to paint thinners. Moreover, samples of distilled spirits receiving high reviews, comparable or in some cases better than an aged spirit, do not always have a high ethyl acetate concentration. Using modern techniques, highly prized spirits can be analyzed for their chemical make-up. Using this data, chemical markers can be selected as a model for a mature spirit. Surprisingly, these chemical markers provide advantages over the traditional measurement of ethyl acetate concentration to determine age. In particular, the chemical markers set forth herein are desirable for modeling purposes because, unlike ethyl acetate, the chemical markers contribute to the desired flavor profile.

The inventor has surprisingly discovered that a set of chemical markers may be correlated with the flavor characteristics of a mature spirit regardless of ethyl acetate concentration. Furthermore, methods to reduce the ethyl acetate concentration during maturation have been discovered. Because the flavor of ethyl acetate is not desirable, this discovery improves the flavor profile of the spirits made by this method. In one embodiment, ethyl acetate concentrations are reduced to a concentration less than about 200,000 μg/L. In another embodiment, the ethyl acetate concentrations range between about 50,000 μg/L to about 170,000 μg/L.

A mature distilled spirit having the characteristics associated with a matured distilled spirit, as used herein, describes a spirit, which has attained a flavor and aroma profile organoleptically similar to spirits aged with wood for many years, and typically showing a chemical profile containing key chemical markers in particular proportions.

In one embodiment, a mature spirit can be characterized by the increasing concentrations of one or more chemical markers. Three markers in particular, are thought to be particularly useful for defining a mature spirit: sinapaldehyde, ethyl decanoate, and ethyl dodecanoate. Ethyl decanoate and ethyl dodecanoate are often found in unmature spirits at low concentrations. Sinapaldehyde is typically not found in an unmature spirit.

In one embodiment, a mature spirit is characterized by an increase of at least about 3× for ethyl dodecanoate over an unmature spirit. In another embodiment, a mature spirit is characterized by an increase of at least about 3× for ethyl decanoate over an unmature spirit. Increased concentrations may be assessed by any method known in the art.

A spirit that presents these three compounds in relative proportion (as assessed by peak height measured by GCMS)

typically has desirable flavor characteristics. In this regard, a mature spirit may also be characterized by a sinapaldehyde peak greater than 80% and less than 200% of the peak height of ethyl decanoate and ethyl dodecanoate as measured by GCMS. Without being bound to any theory, it is believed that sinapaldehyde concentration is disproportionately important in creating a spirit that meets the organoleptic properties of a mature spirit.

Figure 5:
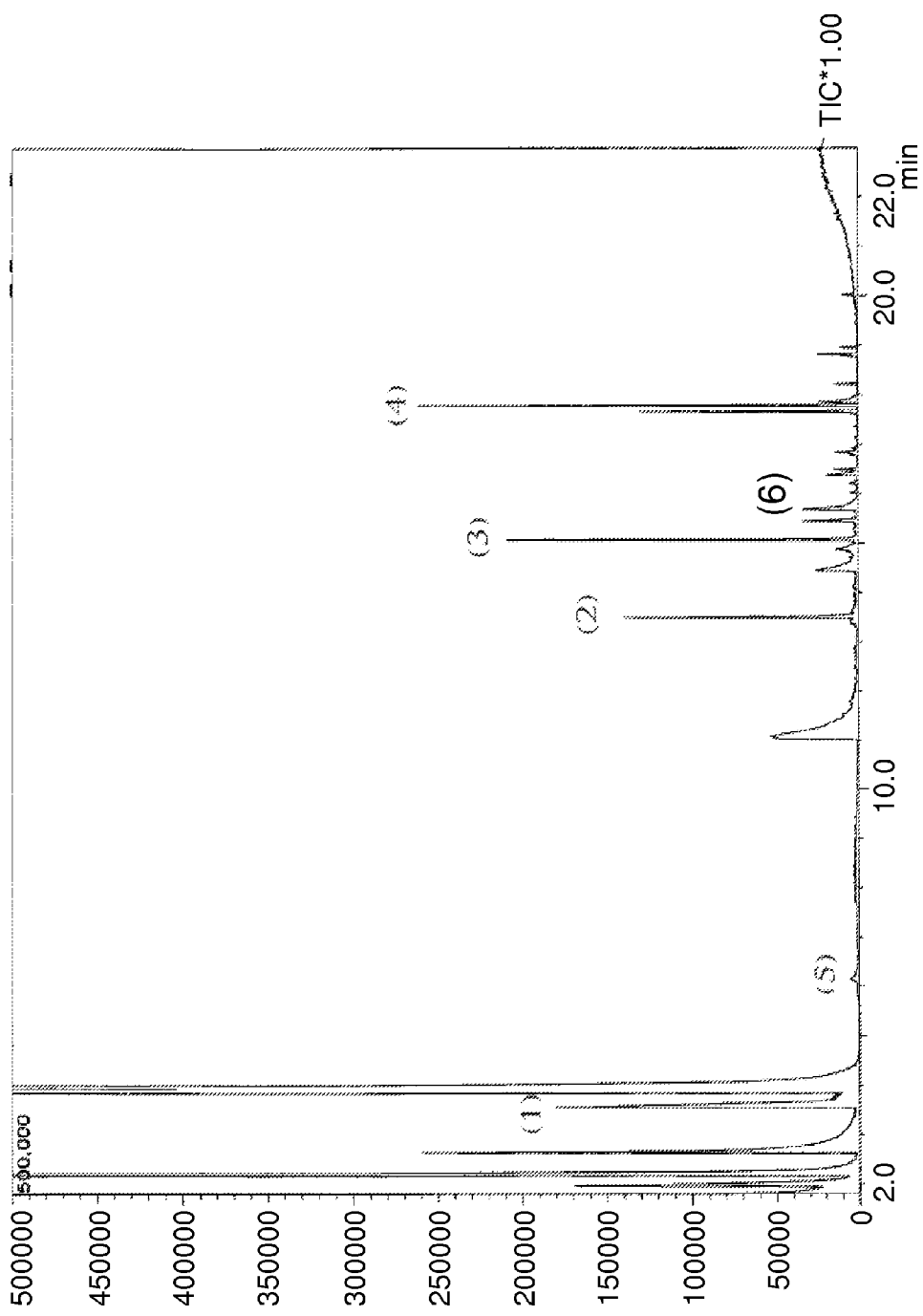
FIG. 5 shows the GCMS chromatogram from a rum sample that is a mixture of rum subjected to heat and rum subjected to actinic light in accordance with Example 5.

In another embodiment, a mature spirit is one that produces relative peak heights that are substantially similar to the peak heights shown in FIG. 5 for sinapaldehyde, ethyl decanoate, and ethyl dodecanoate. "Substantially similar," as used herein, refers to a relative peak height differing by no more than 30%, no more than 25%, no more than 20%, no more than 15%, no more than 10%, no more than 5%, or no more than 2%. In still another embodiment, a mature spirit is one that produces relative peak heights that are substantially similar to the relative peak heights shown in FIG. 5 for sinapaldehyde, ethyl decanoate, ethyl dodecanoate, and acetyl. In still a further embodiment, a mature spirit is one that produces relative peak heights that are substantially similar to the relative peak heights shown in FIG. 5 for sinapaldehyde, ethyl decanoate, ethyl dodecanoate, acetyl, and syringaldehyde.

Figure 6:
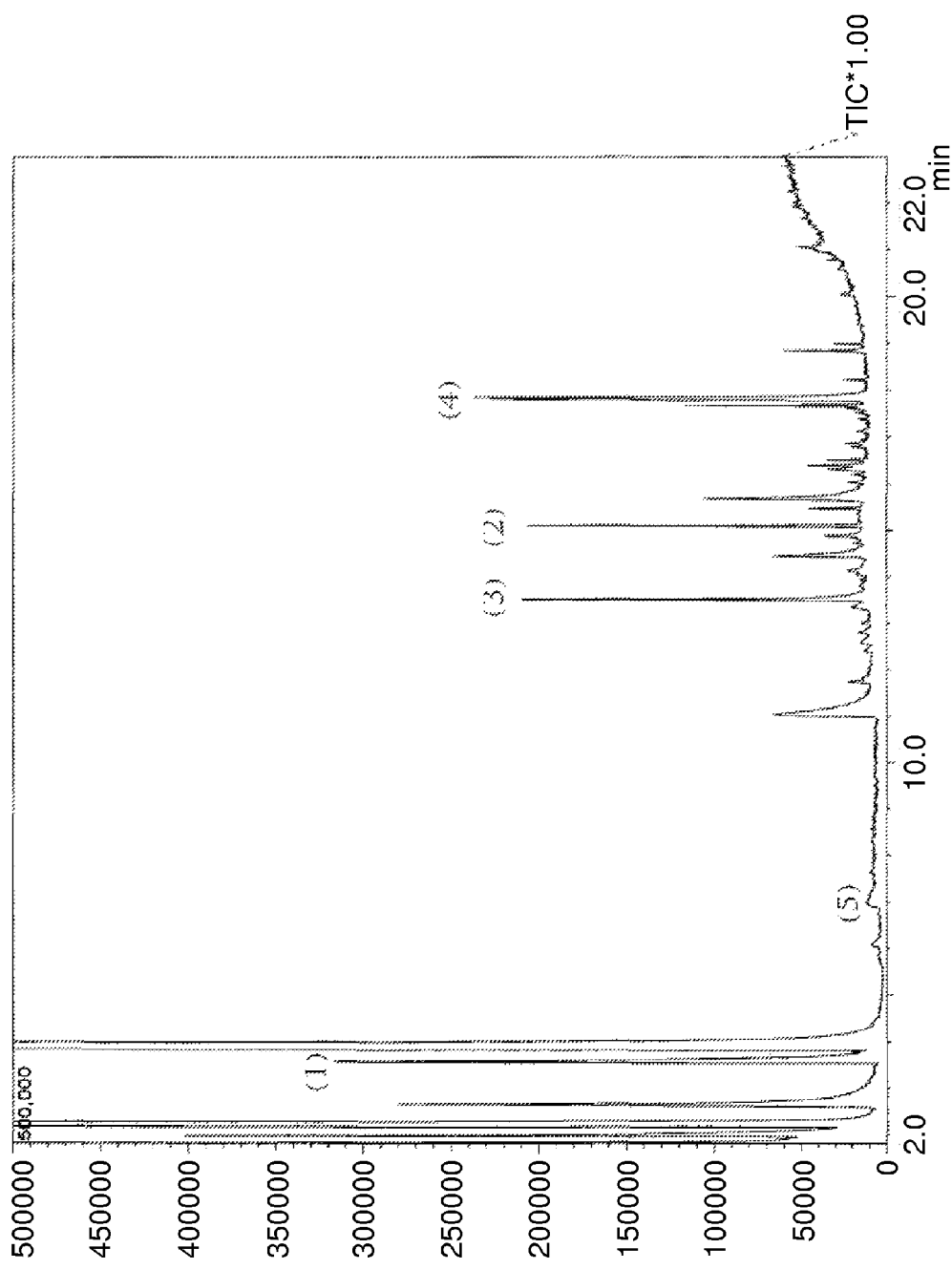
FIG. 6 shows the GCMS chromatogram from a rum sample that has been processed with both heat and light in accordance with Example 6.

In yet another embodiment, a mature spirit is one that produces relative peak heights that are substantially similar to the relative peak heights shown in FIG. 6 for sinapaldehyde, ethyl decanoate, and ethyl dodecanoate. In still another embodiment, a mature spirit is one that produces relative peak heights that are substantially similar to the relative peak heights shown in FIG. 6 for sinapaldehyde, ethyl decanoate, ethyl dodecanoate, and acetyl. In yet another embodiment, a mature spirit is one that produces relative peak heights that are substantially similar to the relative peak heights shown in FIG. 6 for sinapaldehyde, ethyl decanoate, ethyl dodecanoate, acetyl, and syringaldehyde.

The unmatured distilled spirit is a spirit that has not attained the markers or characteristics associated with a matured distilled spirit. The "unmatured distilled spirit," as described herein, refers to white or raw spirits, as well as partially matured spirits, provided that the unmatured distilled spirit is lacking in certain characteristics of a matured spirit. The unmatured distilled spirit, as described herein, has an alcohol content of at least 50% by volume. In some embodiments, the alcohol content of the unmature distilled spirit is between 50% and 80% by volume.

The term "distilled spirit mixture," as used herein, refers to any distillate on the spectrum from matured to unmatured. The term "distillate" as used herein refers to the liquid composition in the vessel and may include an unmatured distilled spirit, a matured distilled spirit, or a distilled spirit mixture.

The unmatured distilled spirit is contacted with wood in a vessel. In one embodiment, the wood is provided as the vessel for holding the distillate. In such embodiments, the vessel is, for example, an oak barrel. In other embodiments, wood may be provided to the inside of the reaction vessel, which is optionally made of wood. For example, wood chips may be added such that they are submerged or floating on top of the distillate. Wood may also be provided as various structural configurations within the vessel including as baffles or packing. In still other embodiments, wood may include wood extracts and raw acids designed to mimic the characteristics of wood. In a preferred embodiment, the wood is oak.

Of the various advantages of the present invention, one is that no additional ingredients or acids are provided to facilitate the process. In this regard, the process is free of additives. Without being bound to any particular theory, it is thought that the inventive process rapidly extracts acids from the wood. These acids facilitate the esterification process without the need for additives beyond the wood and the unmatured distilled spirit.

A. Sequential Temperature and Light Processing

One aspect of the present invention provides a process for producing a mature spirit using sequential temperature and light processing. In this regard, the process comprises the steps of (a) contacting an unmatured distilled spirit with wood at a temperature between about 140° F. and about 170° F. for a period of time ranging from about 24 hours to about 336 hours to give a distilled spirit mixture; (b) contacting the distilled spirit mixture with wood and actinic light at a wavelength ranging from 400 nm to 1000 nm for a cumulative exposure of at least 2,280,000 lux hours to give an actinic light-treated distilled spirit mixture; and (c) providing heat to the actinic light-treated distilled spirit mixture produced in step (b) to maintain a temperature between about 140° F. and about 170° F. for a period of time ranging from about 12 hours to about 336 hours to produce the mature spirit.

(i) First Thermal Process

In the sequential process described herein, the unmatured spirit is be subjected to thermal processing. In this regard, the unmatured distilled spirit is contacted with the wood at a temperature ranging from about 140° F. to about 170° F. In alternate embodiments, the temperature ranges from about 140° F. to about 150° F., from about 145° F. to about 150° F., from about from about 150° F. to about 160° F., or from about 160° F. to about 170° F.

Figure 3:
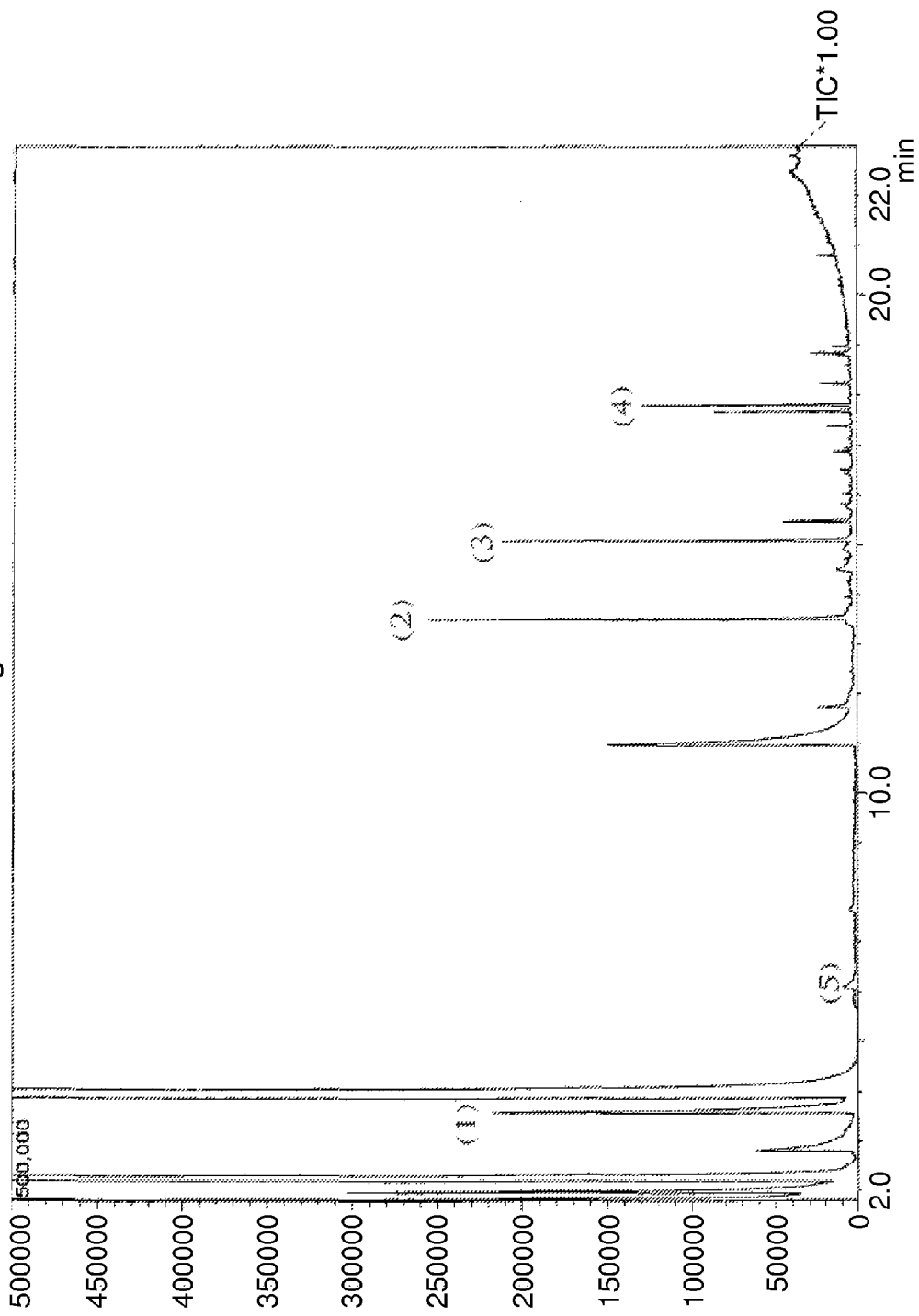
FIG. 3 shows the GCMS chromatogram from a rum sample that was subjected to heating in accordance with Example 3 but was not subjected to actinic light.

The time period needed to convert the unmatured distilled spirit to a distilled spirit mixture having partial characteristics associated with a matured spirit, for example, as shown in FIG. 3, depends on factors such as the starting composition of the unmatured distilled spirit and the temperature at which the process is conducted. In some embodiments, a temperature between about 140° F. and about 170° F. is provided for a period of time ranging from about 12 hours to about 336 hours. In alternate embodiments, a temperature between about 140° F. and about 170° F. is provided for a period of time ranging from about 12 hours to about 24 hours, from about 24 hours to about 48 hours, from about 48 hours to about 96 hours, from about 96 hours to about 168 hours, from about 168 hours to about 226 hours, or from about 226 hours to about 336 hours.

The heating is conducted in a sealed vessel or under reflux such that evaporation of volatile compounds is prevented. The pressure inside the vessel can and will vary in different embodiments of the invention. In general, the internal pressure of the vessel housing the reaction components climbs to a maximum of about 6 pounds per square inch (psi). The typical range of pressures in the vessel is between 2 psi and 6 psi, but can be altered to relieve pressure and maintain an operating pressure of less than 1 psi while still achieving the desired chemical reactions.

In one embodiment, the temperature is maintained between about 140° F. and about 150° F. for a period of time ranging from about 168 hours to about 226 hours.

In another embodiment, the temperature is maintained between about 150° F. and about 160° F. for a period of time ranging from about 24 hours to about 72 hours.

Generally, heat is applied continuously through the given time period. But, heat may also be provided for the given time period in a manner that is not continuous, for example, at intervals so long as heat is provided totaling the stated time period. At the end of this time period, a first distilled spirit mixture is provided. In this embodiment of the invention, the first distilled spirit mixture produced by the heat process is further reacted as described below.

Figure 7:
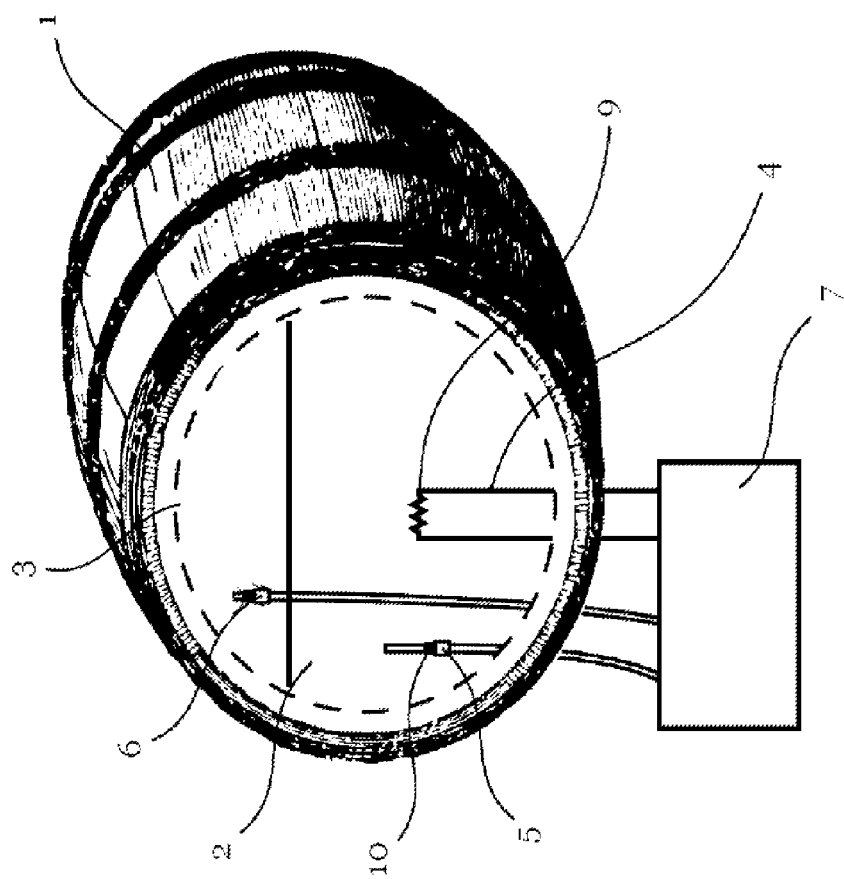
FIG. 7 depicts a wooden barrel for the heat process with a cutaway to show the barrel's internals.

The heat process may be conducted in an apparatus as shown in FIG. 7, which shows a cutaway view of one possible internal configuration. The vessel 1 may be a wooden barrel.

Figure 8:
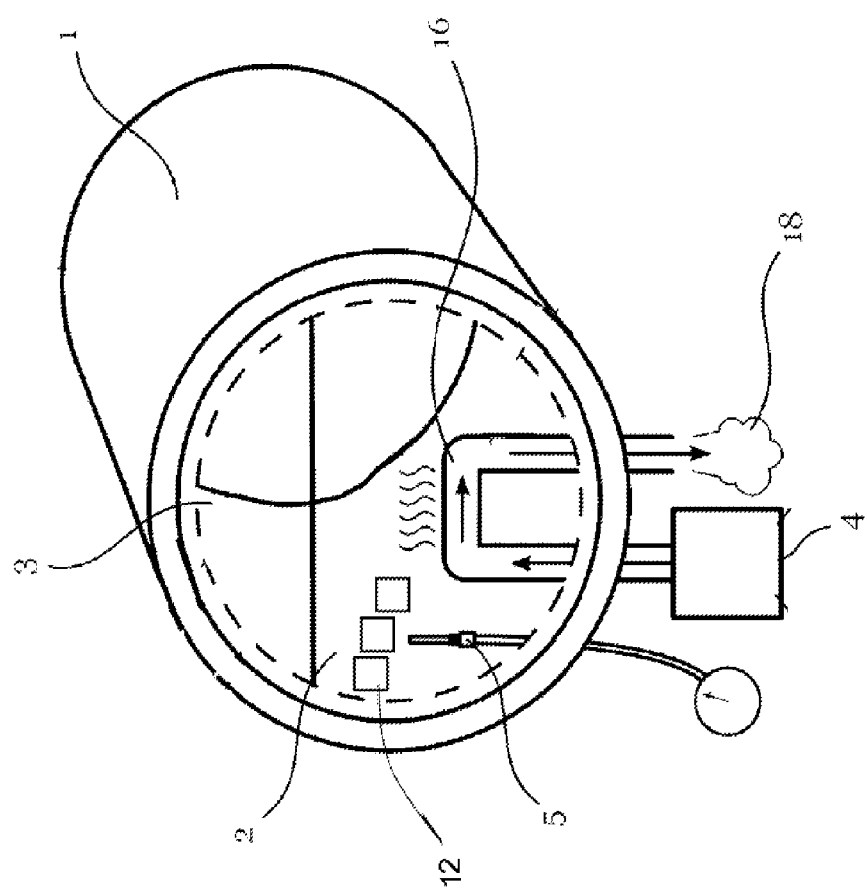
FIG. 8 depicts a sealed vessel for the heat process with a cutaway to show the vessels internals.

In the embodiment depicted in FIG. 8, a cutaway is shown using dashed lines to reveal another possible internal confirmation of the vessel 1, where vessel 1 may be a stainless steel container. In this embodiment, the wood 12 is provided as chips or planks submerged in or floating on top of the distillate 2.

For both FIG. 7 and FIG. 8, heat may be applied to the distillate 2 inside the vessel 1 via a heat source 4. In one embodiment, the vessel is sealed under pressure. In another embodiment, the vessel is heated under reflux to prevent evaporation of volatile compounds. Any method for introducing sufficient heat to the distillate including an internal electrical heating element 9 may be used. In such an embodiment, temperature may be controlled by manipulating electrical current in the internal electrical heating element 9 circuit. In alternate embodiments the heat source 4 is external and may be used with a conduit 16, conductor, or the like. In one non-limiting example, steam 18 may be created using an external boiler as the heat source 4 in one embodiment, then passed through a conduit 16 running through the vessel 1, wherein a conductive portion 16 of the conduit is submerged in the distillate 2. In such an embodiment, the temperature of the distillate 2 may be controlled by varying the amount of steam 18 produced by the boiler. Such control may be provided by valves or similar means that are not pictured.

In one embodiment, the temperature of the distillate 2 in the vessel 1 is brought up to a temperature of about 160° F. for a period of up to 48 hours. This process simultaneously extracts wood derived compounds and acids, some of which are thought to be esterification catalysts. In one embodiment, the temperature of the distillate is measured via a temperature sensor 5. Any known temperature sensor may be used. The temperature of the distillate 2 may be controlled by manually manipulating the heat source 4. In an alternate embodiment, an electronic temperature sensor is coupled 10 to a controller 7. The controller 7 may be configured to present an alert (e.g., flash a light, produce a sound, produce an electrical signal, transmit a text message, e-mail or other electronic communication, etc.) when the temperature of the distillate 2 is outside of a provided range. Optionally, the controller 7 may be coupled to the heat source 4, in which case, the controller is configured to manipulate the heat source to keep the temperature of the distillate 2 within the provided range.

Heating in accordance with the invention triggers the esterification of free volatile acids and alcohols in the distillate 2, while the headspace 3 provides for reflux within the vessel 1 allowing any weak acids to be rapidly extracted from the wood. These weak acids, in combination with elevated temperatures, appear to help catalyze the esterification of free acids in the distillate per the Fischer process, which would otherwise take many years in traditional containers.

The pressure inside the container may be measured by a pressure sensor 6. The pressure sensor 6 may be coupled to the controller 7. The pressure sensor may be configured to provide alerts if the pressure becomes too high. The pressure sensor may optionally be configured to communicate to open a release valve if the pressure is too high.

(ii) Actinic Light Process

The first distilled spirit mixture provided in step (i) is generally allowed to cool and transferred for processing with actinic light. In accordance with one embodiment of the invention, the first distilled spirit mixture is contacted with actinic light in the range of 400 nm to 1000 nm for a cumulative exposure of at least 2,280,000 lux hours to give an actinic light-treated distilled spirit.

The actinic light process takes place in a container that allows light in the UV-Visible spectrum to pass through. The container is filled with the spirit to be processed and is also generally filled with wood as described in the previous step. In one embodiment, glass carboys are used. The actinic light may come from a variety of sources including natural, synthetic, or a combination thereof. Generally, the exposure in this step will be at least 2,280,000 lux hours, but sometimes as high as 20,000,000 lux hours. In other embodiments, the total exposure is at least 1,000,000 lux hours, at least 1,500,000 lux hours, at least 2,000,000 lux hours, at least 2,500,000 lux hours, or at least 3,000,000 lux hours. Where very high concentrations of the chemical markers described herein are sought even greater exposures might be appropriate.

The time period over which the actinic light process is conducted can and will vary over different embodiments. Where natural light is used, the total exposure to actinic light may range from about 100 hours to about 500 hours, from about 250 hours to about 750 hours, from about 500 hours to about 1000 hours, from about 750 hours to about 1250 hours, or from about 1000 hours to about 1500 hours. Where synthetic lights are used, the total exposure to actinic light may range from about 12 hours to about 24 hours, from about 24 hours to about 48 hours, from about 48 hours to about 96 hours. If artificial lights are used that provide a very low lux value, time is increased proportionally to achieve the lux hour value.

Preferably, the actinic light process is conducted below the boiling point of the spirit. In some embodiments, this requires that the amount or duration of actinic light is controlled, for example, by exposing the spirit to light in a discontinuous manner, by cooling the spirits, by temporarily shielding the spirit from the actinic light, or by other methods for controlling temperature that are known in the art. This process may also be carried out under reflux to prevent the evaporation of volatile compounds.

Although pressure is not thought to be critical to the actinic light processing, the actinic light processing is generally conducted at atmospheric pressures. The light processing step may accommodate higher or lower pressures.

In one preferred embodiment, a tungsten halogen bulb is used to provide the actinic light. The bulb has an average light temperature of 2900°. The sprits are placed in clear containers where about 100 liters of spirit cover a square meter. The area is illuminated to about 190,000 lux with the light being toggled off and on in periods of 2-4 hours to reach a total exposure of 4,500,000 lux hours. Lux hours, as used herein, describes the light exposure in a given hour because it describes the total luminescence in a given time. Radiant flux measurements were unavailable because the data was not available.

In another embodiment, a distilled spirit is placed in a translucent jar that was kept in a greenhouse for 168 hours to achieve a total of approximately 4,200,000 lux hours.

In another embodiment, twenty 500 W halogen bulbs are used to provide light to seventy jars. The lights are toggled on and off for three days to provide the total lux hours needed for the reaction.

In still another embodiment, 500 W halogen bulbs are shined on both sides of a glass jar. The lights are toggled on and off for 14 hours to provide the total lux hours needed for the reaction.

When the actinic light processing is complete, the resulting actinic light-treated spirit mixture is removed from the light source.

(iii) Second Thermal Process

The sequential process further involves a temperature process conducted with the resulting mixture from Section A(ii). In this regard, the actinic light-treated distilled spirit mixture is heated to maintain the temperature of the actinic light-treated distilled spirit mixture between about 140° F. and about 170° F. for a period of time ranging from about 12 hours to about 336 hours in a sealed vessel or under reflux such that evaporation of volatile compounds is prevented to produce a mature spirit.

The process of heat treating the actinic light-treated spirit is conducted in the manner described in Section A(i) except that the process is performed on the actinic light-treated distilled spirit mixture produced in accordance with Section A(ii). Beneficially, this step triggers a marked reduction in ethyl acetate concentrations generated during the actinic light treatment, shown experimentally to be greater than 60%.

(iv) Optional Further Processing

Optionally, the spirit produced by the process described in Sections A(i) through A(iii) may be followed by one or more additional actinic light or thermal processing steps. For example, a second actinic light processing step may be conducted on the product obtained by the second thermal processing step. A third thermal processing step may also be utilized after a second actinic light processing step. In one embodiment, the processes includes a further step of (d) of contacting the product of step (c) with wood and actinic light at a wavelength ranging from 400 nm to 1000 nm for a cumulative exposure of at least 2,280,000 lux hours. In still another embodiment, the process further comprises the step (e) of contacting the product of step (d) with wood at a temperature between about 140° F. and about 170° F. for a period of time ranging from about 24 hours to about 336 to give a first distilled spirit mixture In one embodiment, the sequential process may be repeated until a desired chemical marker profile is obtained.

(v) Inverted Sequential Embodiment

In still another embodiment of the present invention, the sequential process begins with an unmature distilled spirit contacted with actinic light as described in Section (A)(ii) to form an actinic light-treated distilled spirit mixture. Following this treatment, the actinic light-treated distilled spirit mixture is treated thermally as described in Section (A)(i). These steps may be repeated until a desired flavor profile is obtained as determined by the chemical markers described herein.

B. Mixed Batch Process

In another embodiment, the present disclosure provides a mixed batch process for producing a mature spirit. In this embodiment, the process comprises (a) contacting a first unmatured distilled spirit with wood at a temperature between about 140° F. and about 170° F. for a period of time ranging from about 24 hours to about 336 to give a first distilled spirit mixture; (b) contacting a second unmatured distilled spirit with wood and actinic light at a wavelength ranging from 400 nm to 1000 nm for a cumulative exposure of at least 2,280,000 lux hours to give a second distilled spirit mixture; and (c) mixing the first and second distilled spirit mixtures to produce the mature spirit.

Step (a) of the process is conducted as described in Section (A)(i). The resulting first distilled spirit mixture is not reacted with light. Separately, a second unmatured distilled spirit mixture is treated with actinic light as described in Section (A)(ii). The resulting second distilled spirit mixture is not treated by the thermal processing step of Section (A)(i). Instead, the first distilled spirit mixture and the second distilled spirit mixture are mixed together.

The first distilled spirit mixture and the second distilled spirit mixture may be mixed in any ratio without limitation. In one embodiment, the ratio ranges between about 70:30 and about 30:70 of the first distilled spirit mixture to the second distilled spirit mixture. In particular embodiments, the ratio of the first distilled spirit mixture and the second distilled spirit mixture is about 70:30, about 65:35, about 60:40, about 55:45, about 50:50, about 45:55, about 40:60, about 35:65, or about 30:70. High concentration products may range from 99:1 to 1:99, or, more preferably from a ratio of 95:5 to 5:95 of the first distilled spirit mixture to the second distilled spirit mixture.

The mixture of the first distilled spirit mixture and the second distilled spirit mixture is generally allowed to react for at least 1 hour. Without being bound to any theory, it is believed that chemical reactions occur during this time period that enhance the flavor profile over the flavor profile of the separately produced first distilled spirit mixture and the second distilled spirit mixture.

C. Simultaneous Heat and Light Processing

In still another embodiment, the present disclosure provides simultaneous process for producing a mature spirit. In this embodiment, the process comprises contacting a unmatured distilled spirit with wood and maintaining the temperature between about 140° F. and about 170° F. for a period of time ranging from about 12 hours to about 336 hours, and at the same time, contacting the unmatured distilled spirit with actinic light at a range of 400 nm to 1000 nm for a cumulative exposure of at least 2,280,000 lux hours to give a mature spirit. Thermal processing is conducted as described in Section (A)(i). Actinic light exposure is as described in Section (A)(ii).

D. Production of a Matured Spirit by Measuring Chemical Markers

In still another embodiment, the disclosure provides a process for producing a spirit having characteristics of FIG. 5 or 6, as described herein. The process comprises (a) obtaining a marker concentration of an ester in a target matured distilled spirit thereby giving a target marker concentration, such as ethyl decanoate, as shown in FIG. 5 or 6, (b) contacting an unmatured distilled spirit with wood and processing as described in Sections A-C to form a distilled spirit mixture, measuring the marker concentration of the distilled spirit mixture, and (d) processing the distilled spirit mixture as described in Sections A-C until the marker concentration of the distilled spirit mixture reaches the target marker concentration.

Once the chemical marker concentration of the distilled sprit mixture is obtained it may be compared to the target marker concentration in order to determine if heating and/or actinic light treating steps as described in Sections A-C can be discontinued. When the target concentration is not met, heating and/or light treatment steps are repeated. Thus, the method provides a tunable process for producing a distilled spirit having characteristics associated with, for example, FIG. 5 or 6. In one embodiment, the chemical marker associated with a matured distilled spirit may be ethyl decanoate. The process disclosed above, however, is not limited to ethyl decanoate, but can be any other ester that has higher concentrations in a matured distilled spirit as compared to an unmatured distilled spirit. Esters are ideal markers for a heat process because the heat process excels at forming esters as opposed to other semi-volatile compounds like sinapaldehyde.

Markers for the process include, but are not limited to ethyl decanoate, ethyl dodecanoate, ethyl octanoate, ethyl butyrate, and ethyl hexadecanoate. In some embodiments, volatile esters can be used as chemical markers. But, semi-volatiles are preferred because they behave more predictably during processing.

EXAMPLES

Instrumentation

Gas Chromatography Mass Spectrometry (GCMS) Data was obtained using a Shimadazu GCMS Model QP2010 with a Restek Column—Rxi-5Si1 MS, 30 meter, 0.24 mmID, 0.24 umdf. Program conditions were as follows:

TABLE 1

| Analytical Line 1 | |
|---|---|
| # of Rinses with Presolvent | 1 |
| # of Rinses with Solvent(post) | 5 |
| # of Rinses with Sample | 1 |
| Plunger Speed(Suction) | Middle |
| Viscosity Comp. Time | 5.0 sec |
| Plunger Speed(Injection) | High |
| Syringe Insertion Speed | High |
| Injection Mode | Normal |
| Pumping Times | 3 |
| Inj. Port Dwell Time | 10.0 sec |
| Terminal Air Gap | No |
| Plunger Washing Speed | High |
| Washing Volume | 6 uL |
| Syringe Suction Position | −2.0 mm |
| Syringe Injection Position | 0.0 mm |
| Solvent Selection | All A, B, C |

TABLE 2

| GC PARAMETERS | |
|---|---|
| Column Oven Temp. | 35.0° C. |
| Injection Temp. | 265.0° C. |
| Injection Mode | Split |
| Flow Control Mode | Linear Velocity |
| Pressure | 56.0 kPa |
| Total Flow | 23.9 mL/min |
| Column Flow | 1.12 mL/min |
| Linear Velocity | 38.0 cm/sec |
| Purge Flow | 0.5 mL/min |
| Split Ratio | 20.0 |
| High Pressure Injection | OFF |
| Carrier Gas Saver | ON |
| Carrier Gas Saver Split Ratio | 5.0 |
| Carrier Gas Saver Time | 10.00 min |

TABLE 3

| OVEN TEMP. PROGRAM | | |
|---|---|---|
| Rate | Temperature (° C.) | Hold Tim (min) |
| | 35.0 | 5.00 |
| 16.00 | 300.0 | 1.44 |

TABLE 4

| MS PARAMETERS | |
|---|---|
| IonSourceTemp | 220.00° C. |
| Interface Temp. | 280.00° C. |
| Solvent Cut Time | 1.80 min |
| Detector Gain Mode | Relative |
| Detector Gain | 0.20 kV |
| Threshold | 500 |
| Start Time | 1.80 min |
| End Time | 23.00 min |
| ACQ Mode | Scan |
| Event Time | 0.50 sec |
| Scan Speed | 1000 |
| Start m/z | 35.00 |
| End m/z | 500.00 |

Comparative Example 1

Fresh Rum

A sample of fresh, unmature pot distilled rum was analyzed by GCMS. FIG. 1 shows the semi-volatile fingerprint of an un-aged pot distilled rum. This is largely defined by a lack of activity for compounds having a retention time ranging from 5 to 30 minutes. Noteworthy characteristics include, but are not limited to the starting height of peak 1 corresponding to acetyl, peak 2 corresponding to ethyl decanoate, and peak 3 corresponding to ethyl dodecanoate. The absence of a peak for sinapaldehyde, which is described further in later examples, is noteworthy. FIG. 1 also shows an absence of white noise in the chromatogram starting at the 6 minute retention time point.

Concentration of ethyl acetate was measured by direct injection mass spectrometry. The concentration of ethyl acetate was shown to be about 110,000 µg/L.

Comparative Example 2

Rum Aged for 32 Years by Conventional Ageing Process

Figure 2:
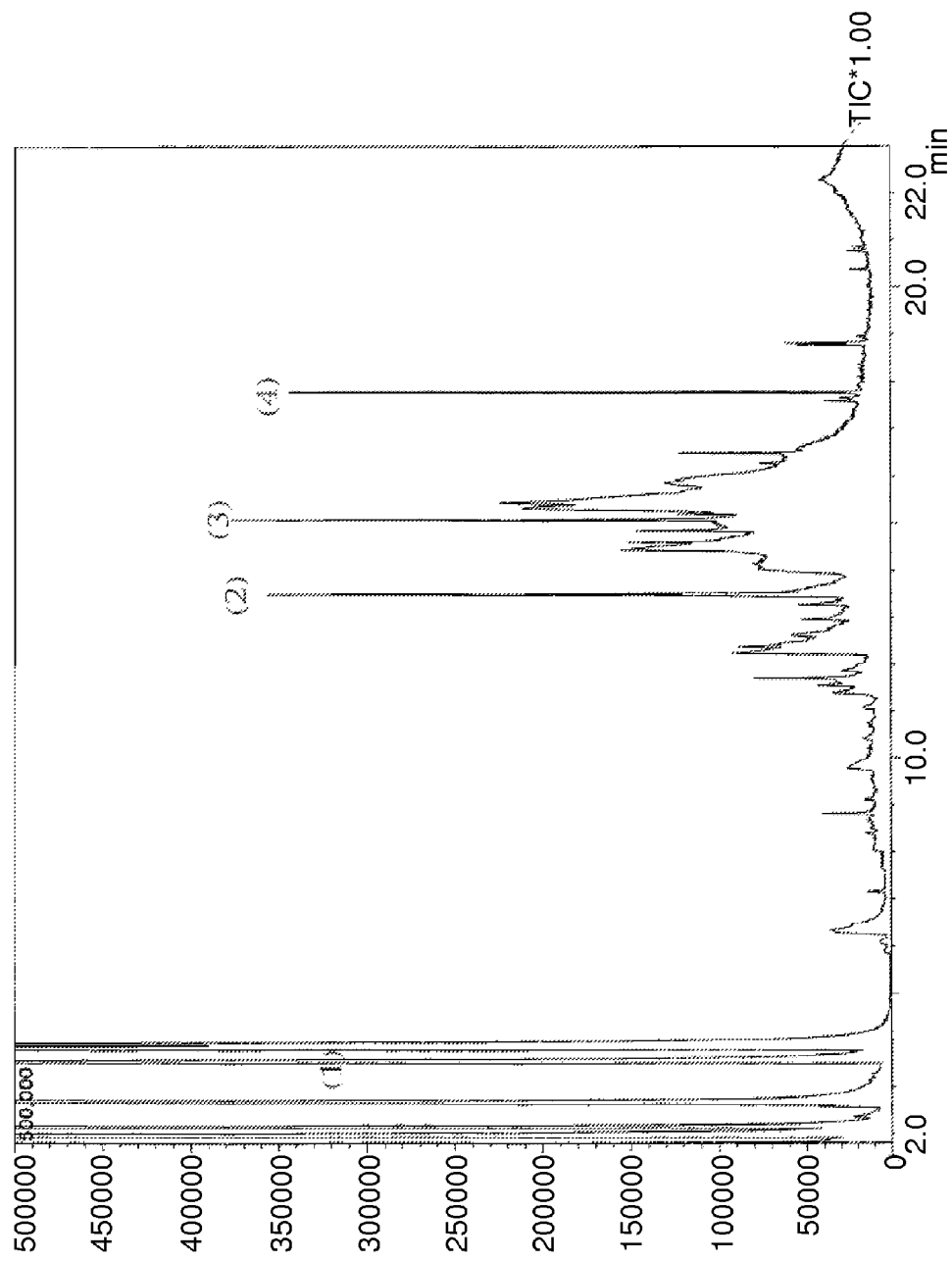
FIG. 2 shows the GCMS chromatogram from a sample of a commercially available rum which has been aged for 32 years by conventional aging techniques.

A sample of a commercially available rum which has been aged for 32 years by conventional aging processes was also analyzed by GCMS. FIG. 2 illustrates a semivolatiles profile characteristic of 32 year aged pot distilled rums. Key characteristics include the high acetal spike (peak 1) the high ethyl decanoate spike (peak 2) the high ethyl dodecanoate spike (peak 3) and the high sinapaldehyde spike (peak #4). The relative heights of peaks 2, 3, and 4 in relation to each other is also important. Organoleptically maintaining this approximate ratio of peak heights to each other proved significant for creating the flavor characteristics associated with aged rum. Further noteworthy is the cluster of medium level peaks centered on the 15-minute mark (thought to be caramel additives and found to include significant amounts of glucose—this phenomena was also observed in known adulterated rum).

The critical differences between the un-aged rum and the 32 year-old rum, that were ascertainable in the semi-volatile chromatograms included the presence of sinapaldehyde (not found in the white rum) alongside peaks showing significantly elevated ethyl decanoate and ethyl dodecanoate levels (both of which are found in the white rum characterized by relatively low peak values). Finally a significant layer of "white noise" (representing a complex mixture of many semi-volatile compounds) lined the bottom of the chromatogram in the 32 years old rum and was absent in the un-aged rum.

Concentration of ethyl acetate was measured by direct injection mass spectrometry. The concentration of ethyl acetate was shown to be about 770,000 μg/L. A more typical reading for ethyl acetate in a 32 year-old sample is 200,000 μg/L.

Comparative Example 3

Heat Only Process

Otherwise unprocessed heavy pot distilled rum was added to a stainless steel tank and mixed with charred oak slabs and heated to between 150° F. and 170° F. Temperature was held in that range for 48 hours. FIG. 3 shows the GCMS chromatogram of the resulting product. The GCMS shows promising (but inadequate) developments of acetyl (peak 1) ethyl decanoate (peak 2), ethyl dodecanoate (peak 3) and sinapaldehyde (peak 4). It also shows the development of some white noise. Overall this sample did not produce all of the organoleptic properties displayed in aged rum. The flavor and aroma of the sample was abnormally thin and lacked the smoky/woody flavors found in the 32 year-old sample. Qualitatively it was unable to meet two of the key chemical marker criteria for the production of aged rum. As can be seen, the white noise level was low. The ethyl dodecanoate (peak 3) and sinapaldehyde (peak 4) failed reach peak heights similar to the ethyl decanoate (peak 2).

Concentration of ethyl acetate was measured by direct injection mass spectrometry. The concentration of ethyl acetate was shown to be about 38,000 μg/L.

Comparative Example 4

Actinic Light Only Process

Otherwise unprocessed heavy pot distilled rum was placed in a sealed flint glass jar along with charred oak slabs and placed in a greenhouse for 30 days. The sample was not subjected to any heat treatment. The sample was analyzed by GCMS. The GCMS shows significant development of acetyl (peak 1) ethyl decanoate (peak 2), ethyl dodecanoate (peak 3) and sinapaldehyde (peak 4). It also shows the development of the level of white noise expected in a mature spirit. But, this sample did not produce the organoleptic properties displayed in aged rum. It was extremely bitter. Qualitatively it was unable to meet one key chemical marker criteria for the production of an aged spirit. The sinapaldehyde (peak 4) was extremely high. It was hypothesized that the extreme level of sinapaldehyde was partially causing the bitterness along with some other observed and abnormally high peaks including furfural (peak 5) and syringaldehyde (peak 6).

Concentration of ethyl acetate was measured by direct injection mass spectrometry. The concentration of ethyl acetate was shown to be about 62,000 μg/L.

Example 5

Mixed Batch Heat and Actinic Light Process

Figure 4:
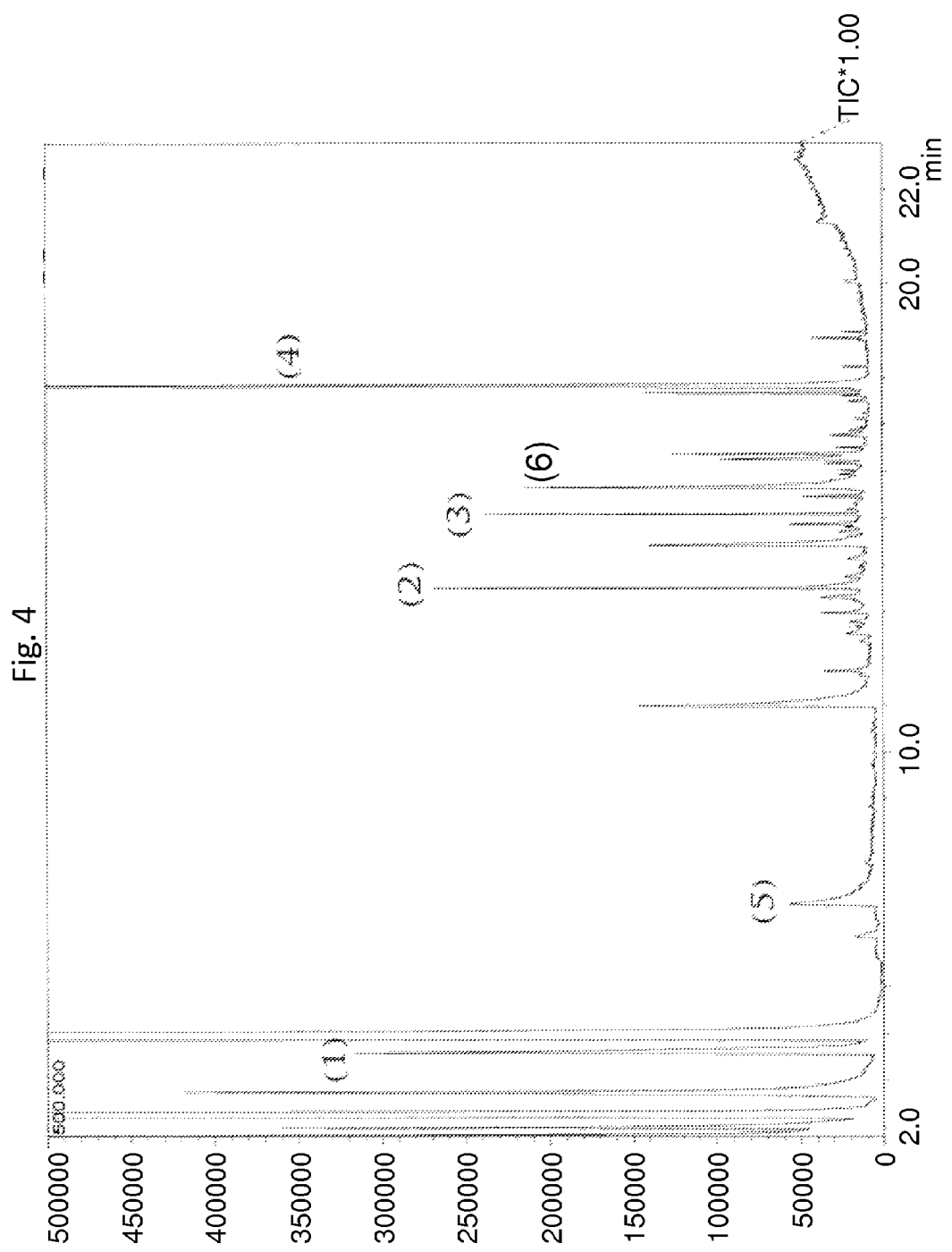
FIG. 4 shows the GCMS chromatogram from a rum sample subjected to actinic light but not to heat in accordance with Example 4.

Otherwise unprocessed heavy pot distilled rum was added to a stainless steel tank and mixed with charred oak slabs and heated to between 150° F. and 170° F. Temperature was held in that range for 48 hours. Separately, an otherwise unprocessed heavy pot still rum was placed in a sealed flint glass jar along with charred oak slabs and placed in a greenhouse for 30 days. The product of the heat treatment and the product of the light treatment were then mixed together with a ratio of 60% of the heat process product and 40% of the actinic light processed rum. This mixture was allowed to react for 24-48 hours. After this time period, the resulting product was analyzed by GCMS. The GCMS chromatogram is shown in FIG. 5. The chromatogram shows some unexpected results along with major developments. The acetyl concentration (peak 1) unexpectedly fell to a concentration lower than that of either of its constituent parts (FIGS. 3 and 4). But, the acetal level was still elevated in comparison to the unprocessed rum (FIG. 1) by a factor of 1.75×. The furfural concentration (peak 5) and syringaldehyde concentration (peak 6) unexpectedly fell sharply correcting the overabundance of these compounds displayed in the actinic light-treated rum (FIG. 4). The ethyl decanoate concentration (peak 2) unexpectedly (and counterproductively) fell to levels lower than those observed in either of the constituent components—yet the peak still remained more than 3× higher than the starting concentration in the unprocessed rum satisfying our minimum criteria for an aged spirit. Ethyl dodecanoate (peak 3) was unaffected by combining the products. Critically, the sinapaldehyde (peak 4) fell to a concentration lower than expected given the extremely high peak found in the actinic light reacted product (FIG. 4). The "white noise" fell significantly and unexpectedly, failing to fully satisfy criteria for an aged spirit. Despite the failure of this product to fully meet some markers of the 32 year-old spirit, this product did produce the organoleptic properties displayed in aged rum, albeit a highly idiosyncratic aged rum. It did not display any of the extreme bitterness found in the actinic light reacted rum (FIG. 4), or the thinness of flavor displayed in the temperature treated rum (FIG. 3). It was observed that the peak heights of ethyl decanoate, ethyl dodecanoate, and sinapaldehyde were all elevated and had come closer to aligning than had been possible in either the heat-treated product or the actinic light-treated product alone. Therefore the mixture of the two products had produced a final product that approached meeting all of the key chemical markers outlined in our definition of a mature spirit.

Concentration of ethyl acetate was measured by direct injection mass spectrometry. The concentration of ethyl acetate was shown to be about 170,000 μg/L.

Example 6

Sequential Temperature and Light Processing

An otherwise unprocessed heavy pot distilled rum was added to a stainless steel tank and mixed with charred oak slabs and heated to between 150° F. and 170° F. Temperature was held in that range for 48 hours. The resulting product was then placed in a sealed flint glass jar along with charred oak slabs and placed in front of a 500 W halogen bulb for 3 days. Seventy glass jars are placed on a shelf surrounded by a total of 20 lights. The lights were toggled on and off in 2-4 hour cycles to prevent boiling. The resulting product was then placed in a stainless steel tank and mixed with charred oak slabs and heated to between 150° F. and 170° F. Temperature was held in that range for 48 hours. The resulting product was analyzed with GCMS.

FIG. 6 shows the GCMS chromatogram from a rum sample that has been processed with both heat and light in accordance with Example 6. It shows some unexpected results along with major developments. Unlike the mixture of the heat and actinic light-treated rum described in FIG. 5, the acetyl concentration (peak 1) is as high as it is in the actinic light reacted rum (FIG. 4) more than 3× the starting concentration found in the unprocessed rum (FIG. 1) satisfying the acetyl chemical marker criteria for an aged spirit. The furfural concentration (peak 5) does not exhibit the overabundance displayed in the actinic light-treated rum (FIG. 4). The ethyl decanoate concentration (peak 2) shows a peak height 25%+/− higher than that found in the mixture of heat treated rum and actinic light reacted rum described in FIG. 5. The peak shows a relative concentration roughly 5× higher than the starting concentration in the unprocessed rum satisfying our minimum ethyl decanoate marker criteria for an aged spirit. The ethyl dodecanoate (peak 3) peak height was identical to that found in the mixture described in FIG. 5 and lines up almost identically with the ethyl decanoate concentration. The sinapaldehyde (peak 4) fell slightly from the light/heat mixture rum described in FIG. 5 critically aligning with the ethyl decanoate (peak 2), and the ethyl dodecanoate (peak 3) satisfying the elusive chemical marker criteria of having peaks 2, 3, and 4 roughly aligned. The "white noise" peaks also rose (as compared to the mixture product displayed in FIG. 5) as a consequence of this modified process satisfying that chemical marker criteria for the production of an aged spirit. As is expected from reading the chromatogram, this product did produce the organoleptic properties displayed in aged rum. It did not display any of the extreme bitterness found in the actinic light reacted rum (FIG. 4), or the thinness of flavor displayed in the temperature treated rum (FIG. 3). It was observed that the peak heights of ethyl decanoate, ethyl dodecanoate, and sinapaldehyde were all elevated and roughly aligned in a way that had not been possible in either the heat-treated product or the actinic light-treated product, or even the mixture of the two (shown in FIG. 5). This process had successfully satisfied all of the key chemical markers outlined in our definition of a mature spirit elegantly solving the industries "30 years in a barrel" problem. It incidentally and beneficially triggered a marked reduction in ethyl acetate concentrations, shown experimentally to be greater than 60% over the batch process (FIG. 5). The process also produced no evaporation of the finished product as would be expected in conventional barrel aging. The finished product not only mimicked the key marker ratios a traditionally aged product, but ultimately improved the process by shortening the time to maturity, eliminating the evaporation, and reducing the ethyl acetate.

Concentration of ethyl acetate was measured by direct injection mass spectrometry. The concentration of ethyl acetate was shown to be about 59,000 µg/L.

What is claimed is:

1. A process for producing a mature spirit comprising:
   (a) providing heat to a mixture consisting essentially of an unmatured distilled spirit and wood, to maintain a temperature between about 140° F. and about 170° F. for a period of time ranging from about 24 hours to about 336 hours to give a distilled spirit mixture; then
   (b) contacting the distilled spirit mixture with wood and actinic light at a wavelength spectrum ranging from 400 nm to 1000 nm from about 12 hours to about 96 hours to give an actinic light-treated distilled spirit mixture; and then
   (c) providing heat to the actinic light-treated distilled spirit mixture produced in step (b) to maintain a temperature between about 140° F. and about 170° F. for a period of time ranging from about 12 hours to about 336 hours to produce the mature spirit,
   wherein steps (a), (b), and (c) are performed sequentially.

2. The process of claim 1, wherein the unmature distilled spirit is selected from the group consisting of sugar cane spirits, grain spirits, fruit spirits, or agave spirits.

3. The process of claim 1, wherein the unmature distilled spirit is selected from the group consisting of rum, tequila, mescal, whiskey, brandy, and gin.

4. The process of claim 1, wherein the mature spirit is characterized by an increase in sinapaldehyde.

5. The process of claim 1, wherein the mature spirit is characterized by an increase in sinapaldehyde, ethyl dodecanoate, and ethyl decanoate.

6. The process of claim 1, wherein the mature spirit is characterized by amounts of sinapaldehyde, ethyl dodecanoate, and ethyl decanoate that are substantially similar to the relative proportions shown in FIG. 6, as measured by GCMS.

7. The process of claim 1, wherein the mature spirit has an ethyl acetate concentration of about 59,000 µg/L.

8. The process of claim 1, wherein steps (a) and (c) are maintained at a temperature between about 140° F. and about 150° F. for a period of time ranging from about 168 hours to about 226 hours.

9. The process of claim 1, wherein steps (a) and (c) are maintained at a temperature between about 150° F. and about 160° F. for a period of time ranging from about 24 hours to about 72 hours.

10. The process of claim 1, wherein the process further comprises:
    (d) contacting the mature spirit of step (c) with wood and actinic light at a wavelength spectrum ranging from 400 nm to 1000 nm from about 12 hours to about 96 hours.

11. The process of claim 10, wherein the process further comprises:
    (e) heating with wood at a temperature between about 140° F. and about 170° F. for a period of time ranging from about 24 hours to about 336 hours after step (d).

12. A process comprising:
    (a) contacting an unmature distilled spirit with wood and actinic light at a wavelength spectrum ranging from 400 nm to 1000 nm from about 12 hours to about 96 hours to give an actinic light-treated distilled spirit mixture; and then
    (b) providing heat to a mixture consisting essentially of the actinic light treated spirit mixture and wood, to maintain a temperature between about 140° F. and about 170° F. for a period of time ranging from about 24 hours to about 336 hours.

13. The process of claim 12, wherein the unmature distilled spirit is selected from the group consisting of sugar cane spirits, grain spirits, fruit spirits, and agave spirits.

14. The process of claim 12, wherein the unmature distilled spirit is selected from the group consisting of rum, tequila, mescal, whiskey, brandy, and gin.

15. The process of claim 12, wherein the process produces sinapaldehyde.

16. The process of claim 12, wherein the process produces sinapaldehyde, ethyl dodecanoate, and ethyl decanoate.

17. The process of claim 12, wherein step (a) is maintained at a temperature between about 140° F. and about 150° F. for a period of time ranging from about 168 hours to about 226 hours.

18. The process of claim 12, wherein step (a) is maintained at a temperature between about 150° F. and about 160° F. for a period of time ranging from about 24 hours to about 72 hours.

19. The process of claim 12, wherein the process further comprises a step after the completion of step (b) wherein a product of step (b) is contacted with wood and actinic light at a wavelength spectrum ranging from 400 nm to 1000 nm from about 12 hours to about 96 hours.

20. A process comprising:
(a) contacting an unmature distilled spirit with wood and actinic light at a wavelength spectrum ranging from 400 nm to 1000 nm from about 12 hours to about 96 hours to give an actinic light-treated distilled spirit mixture; and then
(b) contacting the actinic-light treated spirit mixture and wood at a temperature between about 140° F. and about 170° F. for a period of time ranging from about 24 hours to about 336 hours.

21. The process of claim 20, wherein the unmature distilled spirit is selected from the group consisting of sugar cane spirits, grain spirits, fruit spirits, and agave spirits.

22. The process of claim 20, wherein the unmature distilled spirit is selected from the group consisting of rum, tequila, mescal, whiskey, brandy, and gin.

23. The process of claim 20, wherein the process produces sinapaldehyde.

24. The process of claim 20, wherein the process produces sinapaldehyde, ethyl dodecanoate, and ethyl decanoate.

25. The process of claim 20, wherein step (a) is maintained at a temperature between about 140° F. and about 150° F. for a period of time ranging from about 168 hours to about 226 hours.

26. The process of claim 20, wherein step (a) is maintained at a temperature between about 150° F. and about 160° F. for a period of time ranging from about 24 hours to about 72 hours.

27. The process of claim 20, wherein the process further comprises a step after the completion of step (b) wherein a product of step (b) is contacted with wood and actinic light at a wavelength spectrum ranging from 400 nm to 1000 nm.

* * * * *